United States Patent
Chen (10) Patent No.: US 9,893,472 B1
(45) Date of Patent: Feb. 13, 2018

(54) ELECTRICAL CONNECTOR HAVING A SHIELDING CASE AND AN ANTI-EMI BLOCK

(71) Applicant: Oupiin Electronic (Kunshan) Co., Ltd., Kunshan, Jiangsu Province (CN)

(72) Inventor: Hsin Chih Chen, Kunshan (TW)

(73) Assignee: Oupiin Electronic (Kunshan) Co., Ltd. (CN)

( * ) Notice: Subject to any disclaimer, the term of this patent is extended or adjusted under 35 U.S.C. 154(b) by 0 days.

(21) Appl. No.: 15/488,581

(22) Filed: Apr. 17, 2017

(30) Foreign Application Priority Data

Nov. 29, 2016 (CN) .......................... 2016 1 1073340

(51) Int. Cl.
| | | |
|---|---|---|
| H01R 13/648 | (2006.01) | |
| H01R 13/6586 | (2011.01) | |
| H01R 12/72 | (2011.01) | |
| H01R 13/514 | (2006.01) | |
| H01R 13/627 | (2006.01) | |
| H01R 13/659 | (2011.01) | |

(52) U.S. Cl.
CPC ....... *H01R 13/6586* (2013.01); *H01R 12/721* (2013.01); *H01R 13/514* (2013.01); *H01R 13/6275* (2013.01); *H01R 13/659* (2013.01)

(58) Field of Classification Search
CPC .. H01R 12/721; H01R 13/648; H01R 13/514; H01R 13/6275; H01R 13/6586; H01R 13/6596; H01R 13/6873; H01R 13/659
USPC ............ 439/607.23, 607.24, 607.25, 607.28
See application file for complete search history.

(56) References Cited

U.S. PATENT DOCUMENTS

| | | | | |
|---|---|---|---|---|
| 6,682,368 | B2 * | 1/2004 | Murr ................ | H01R 13/65802 439/607.01 |
| 6,685,504 | B1 * | 2/2004 | Espenshade ....... | H01R 13/6594 439/541.5 |
| 2016/0064871 | A1 * | 3/2016 | Leng ................... | H01R 13/6596 439/607.05 |
| 2016/0149349 | A1 * | 5/2016 | Kao .................... | H01R 13/6586 439/607.05 |
| 2016/0149350 | A1 * | 5/2016 | Kao ..................... | H01R 12/724 439/607.05 |

* cited by examiner

*Primary Examiner* — Chandrika Prasad
(74) *Attorney, Agent, or Firm* — Emerson, Thomson & Bennett, LLC; Roger D. Emerson (57) ABSTRACT

A pluggable connector with anti-electromagnetic interference capability is disclosed in this invention, which includes a socket housing, multiple terminal assemblies and a shielding case. The socket housing includes an insulating base and an anti-EMI block. The insulating base and the anti-EMI block can be combined together to form an upper circuit board slot and a lower circuit board slot. These terminal assemblies are mounted in the socket housing and include multiple signal terminal assemblies and multiple ground terminal assemblies, which are arranged side by side in the order of ground-signal-signal. The shielding case has an upper port and a lower port, which are respectively aligned with the upper circuit board slot and the lower circuit board slot. The pluggable connector of the present invention has a good anti-electromagnetic interference capability by an anti-EMI block.

10 Claims, 11 Drawing Sheets

ELECTRICAL CONNECTOR HAVING A SHIELDING CASE AND AN ANTI-EMI BLOCK

BACKGROUND OF THE INVENTION

1. Field of the Invention

The present invention relates to a connector technology, and more particularly to a pluggable connector with anti-electromagnetic interference capability.

2. Description of the Prior Art

A connector generally includes a metal shell, an insulating body and a conductive terminal. The insulating body is usually made of insulating material, and the metal shell is used for shielding electromagnetic interference.

Currently, the market requires a high speed, high density connector, such as a zQSFP (z-Quad Small Form-factor Pluggable Plus) connector, the data transfer rate of which can be as high as 28 Gbps. For this high speed, high density connector, it is very difficult to achieve a breakthrough in the ability to resist electromagnetic interference by simply relying on the existing metal shell.

Hence, it is necessary to further develop a pluggable connector with more strong anti-electromagnetic interference capability.

BRIEF SUMMARY OF THE INVENTION

A primary object of the present invention is to provide a pluggable connector with anti-electromagnetic interference capability, which disposes an anti-EMI block to improve the anti-electromagnetic interference capability of the pluggable connector.

Other objects and advantages of the present invention may be further understood from the technical features disclosed by the present invention.

To achieve the aforementioned object or other objects of the present invention, the present invention adopts the following technical solution.

The present invention provides a pluggable connector with anti-electromagnetic interference capability, which comprises a socket housing, multiple terminal assemblies and a shielding case. The socket housing includes an insulating base and an anti-EMI block mounted on the insulating base. The insulating base has an upper bracket extending horizontally and a lower bracket being located under the upper bracket. The anti-EMI block is mounted between the upper bracket and the lower bracket. The anti-EMI block has an upright portion, an upper horizontal board located on the top of the upright portion, a lower horizontal board located on the bottom of the upright portion, an upper grounding sheet embedded in the upper horizontal board, a lower grounding sheet embedded in the lower horizontal board, and an upright grounding sheet connecting the upper grounding sheet and the lower grounding sheet and being attached on the upright portion. The upper horizontal board is combined with the upper bracket to form an upper circuit board slot, and the lower horizontal board is combined with the lower bracket to form a lower circuit board slot. The insulating base further has a mounting frame extending rearward from the top of the insulating base and a mounting space formed below the mounting frame. The terminal assemblies are mounted in the mounting space and include multiple signal terminal assemblies and multiple ground terminal assemblies. These terminal assemblies are arranged side by side in the order of ground-signal-signal. The shielding case has an upper port and a lower port. The upper port is aligned with the upper circuit board slot, and the lower port is aligned with the lower circuit board slot.

In one embodiment, the insulating base includes two rows of upper terminal-receiving grooves and two rows of lower terminal-receiving grooves; the two rows of upper terminal-receiving grooves are formed respectively on the upper bracket and the upper horizontal board and are located in the upper circuit board slot, and the two rows of lower terminal-receiving grooves are formed respectively on the lower bracket and the lower horizontal board and are located in the lower circuit board slot.

In one embodiment, each terminal assembly includes a support frame, a pair of upper conductive contact parts extending forward from the front of the support frame, a pair of lower conductive contact parts extending forward from the front of the support frame and being located under the pair of upper conductive contact parts, and multiple conductive tails extending downward from the bottom of the support frame; the pair of upper conductive contact parts are inserted into the corresponding upper terminal-receiving grooves and are exposed in the upper circuit board slot; and the pair of lower conductive contact parts are inserted into the corresponding lower terminal-receiving grooves and are exposed in the lower circuit board slot.

In one embodiment, the upper bracket and the lower bracket are symmetrical to each other and are spaced apart; the upper bracket is inverted U type, and the lower bracket is U type; the upper bracket is provided with a pair of upper guiding grooves, and the lower bracket is provided with a pair of lower guiding grooves. Two edges of the upper grounding sheet protrude out of the left and right sides of the upper horizontal board and are inserted into the pair of upper guiding grooves respectively; and two edges of the lower grounding sheet protrude out of the left and right sides of the lower horizontal board and are inserted into the pair of lower guiding grooves respectively.

In one embodiment, the anti-EMI block further has two support arms being located between the lower horizontal board and the lower horizontal board and protruding respectively from the left and right sides of the upright portion, and two L-shaped grounding arms covering the corresponding support arms.

In one embodiment, the anti-EMI block includes an insulating body and a metal member embedded into the insulating body. The insulating body includes the upright portion, the upper horizontal board, the lower horizontal board and the two support arms; and the metal member includes the upper grounding sheet, the lower grounding sheet, the upright grounding sheet and the two L-shaped grounding arms; each grounding arm forms a protrusion thereon.

In one embodiment, the pluggable connector further comprises a light guide member, which includes two symmetrical light guide tubes being connected together and being made of materials suitable for propagating light; wherein the two light guide tubes are supported by the two support arms and the two grounding arms, the rear ends of the two light guide tubes are fixed on two sides of the socket housing, and the front ends of the two light guide tubes are located in front of the socket housing.

In one embodiment, the pluggable connector further comprises a retainer for fixing these terminal assemblies, wherein the retainer is U-shaped and has a first holding arm and two parallel second holding arms being perpendicular to the first holding arm. The insulating base disposes two holding slots located respectively on two sides thereof. When these terminal assemblies are mounted on the socket housing, the retainer holds the terminal assemblies from the rear of the terminal assemblies, and the fronts of the two second holding arms are engaged with the corresponding holding slots to fix these terminal assemblies.

In one embodiment, there forms multiple long grooves on the top of the mounting space to fix the corresponding terminal assemblies.

In one embodiment, the shielding case includes a shielding frame, a bottom plate mounted on the bottom of the shielding frame, a rear plate mounted on the rear of the shielding frame, a cover around the front of the shielding frame, a spacer located in the middle of the shielding frame for separating the upper port and the lower port, and a grounding spring being located inside the shielding frame and being fixed on the socket housing.

In comparison with the prior art, the pluggable connector of the present invention employs the anti-EMI block to improve the anti-electromagnetic interference capability of the pluggable connector.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "up", "down", "front", "back", "left", "right", "top", "bottom" etc., are only used with reference to the orientation of the accompanying drawings. Therefore, the used directional terms are intended to illustrate, but not to limit, the present invention.

Please refer to FIGS. 1 to 4, a pluggable connector 1 of the present invention includes a shielding case 10, a light guide member 20, a socket housing 30 and multiple terminal assemblies 40.

Figure 1:
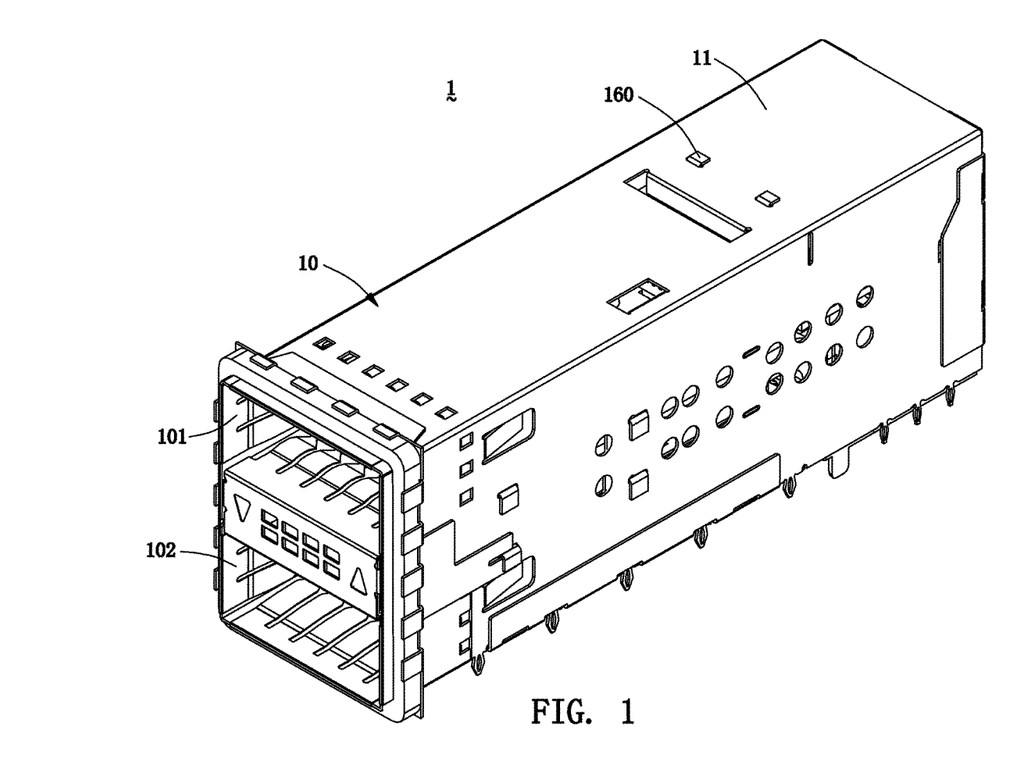
FIG. 1 is a perspective schematic view of a pluggable connector of the present invention.

Referring to FIG. 1, the shielding case 10 forms an upper port 101 and a lower port 102, which are located in the front of the shielding case 10 and are vertically spaced apart, to be used for receiving an outer plug module (not shown).

Figure 2:
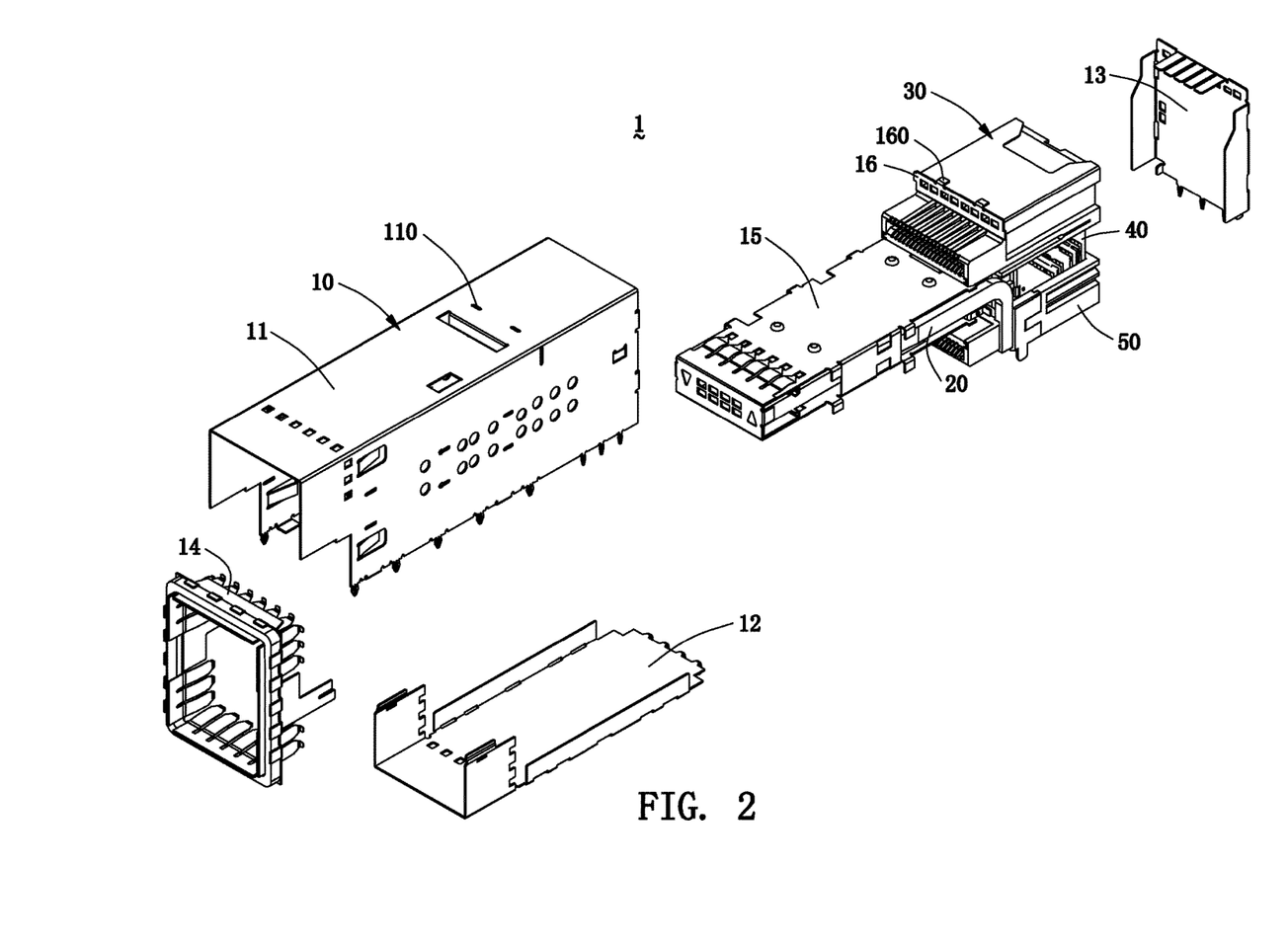
FIG. 2 is a perspective schematic view showing that a shielding case of FIG. 1 is disassembled.

Referring to FIG. 2, the shielding case 10 includes a shielding frame 11, a bottom plate 12 mounted on the bottom of the shielding frame 11, a rear plate 13 mounted on the rear of the shielding frame 11, a cover 14 around the front of the shielding frame 11, a spacer 15 located in the middle of the shielding frame 11 for separating the upper port 101 and the lower port 102, and a grounding spring 16 being located inside the shielding frame 11 and being fixed on the socket housing 30.

Figure 3:
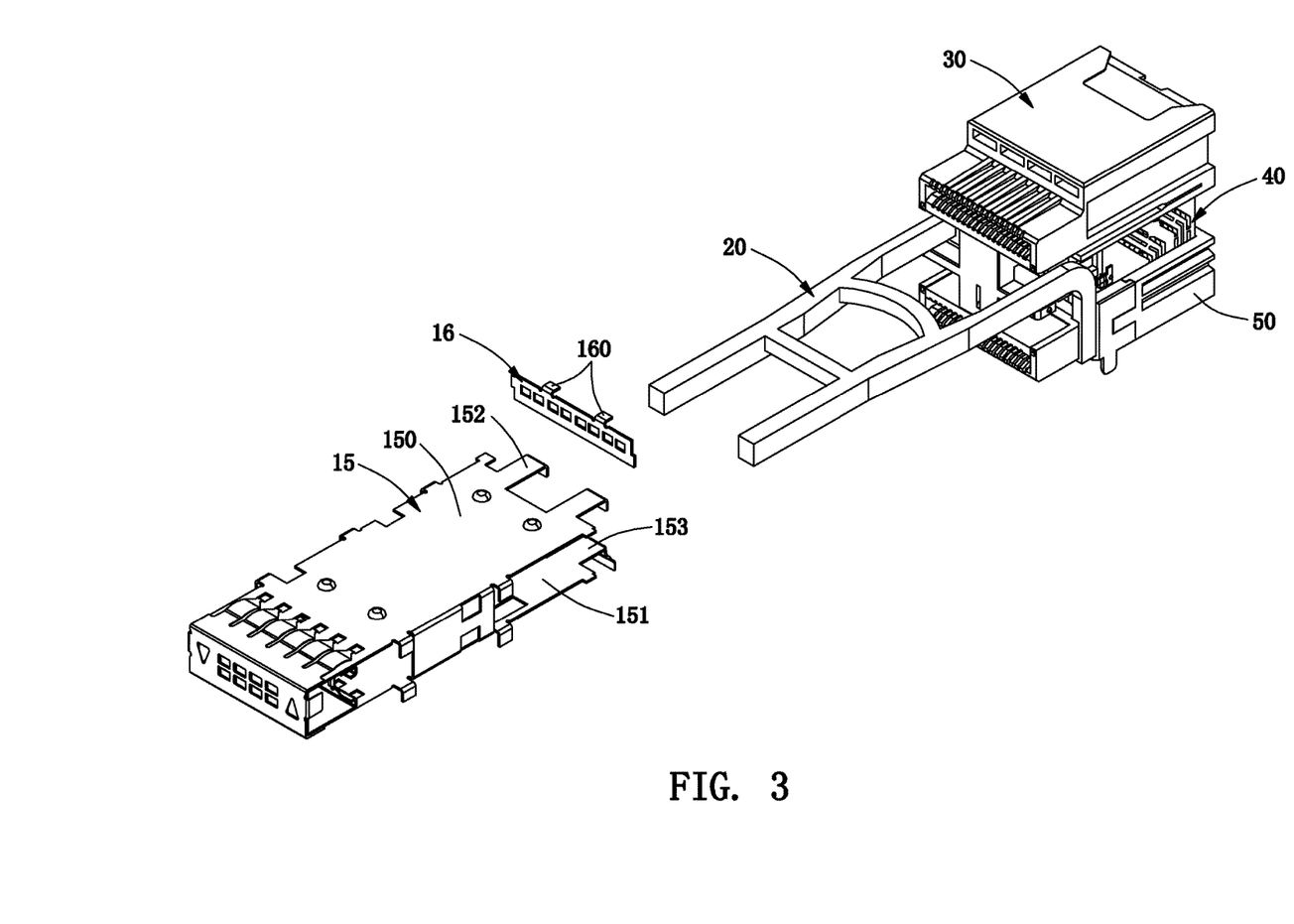
FIG. 3 is a perspective schematic view showing that a spacer and a grounding spring of FIG. 2 are further disassembled.

Referring to FIG. 3, the spacer 15 is U-shaped, and has an upper horizontal sheet 150 and a lower horizontal sheet 151. The upper horizontal sheet 150 forms an upper extension structure 152 on the rear thereof, and the lower horizontal sheet 151 forms a lower extension structure 153 on the rear thereof. The spacer 15 can be fixed on the socket housing 30 by the upper extension structure 152 and the lower extension structure 153.

Referring to FIGS. 2 and 3, the grounding spring 16 is vertically attached on the socket housing 30. The grounding spring 16 disposes a pair of hooks 160, which can pass through a pair of narrow holes 110 (seen in FIG. 2) formed on the top of the shielding frame 11, for fixing the grounding spring 16 to the shielding frame 11 and forming a grounding path. As shown in FIG. 1, the pair of hooks 160 can pass through the top of the shielding frame 11 to be retained on the shielding frame 11.

Figure 4:
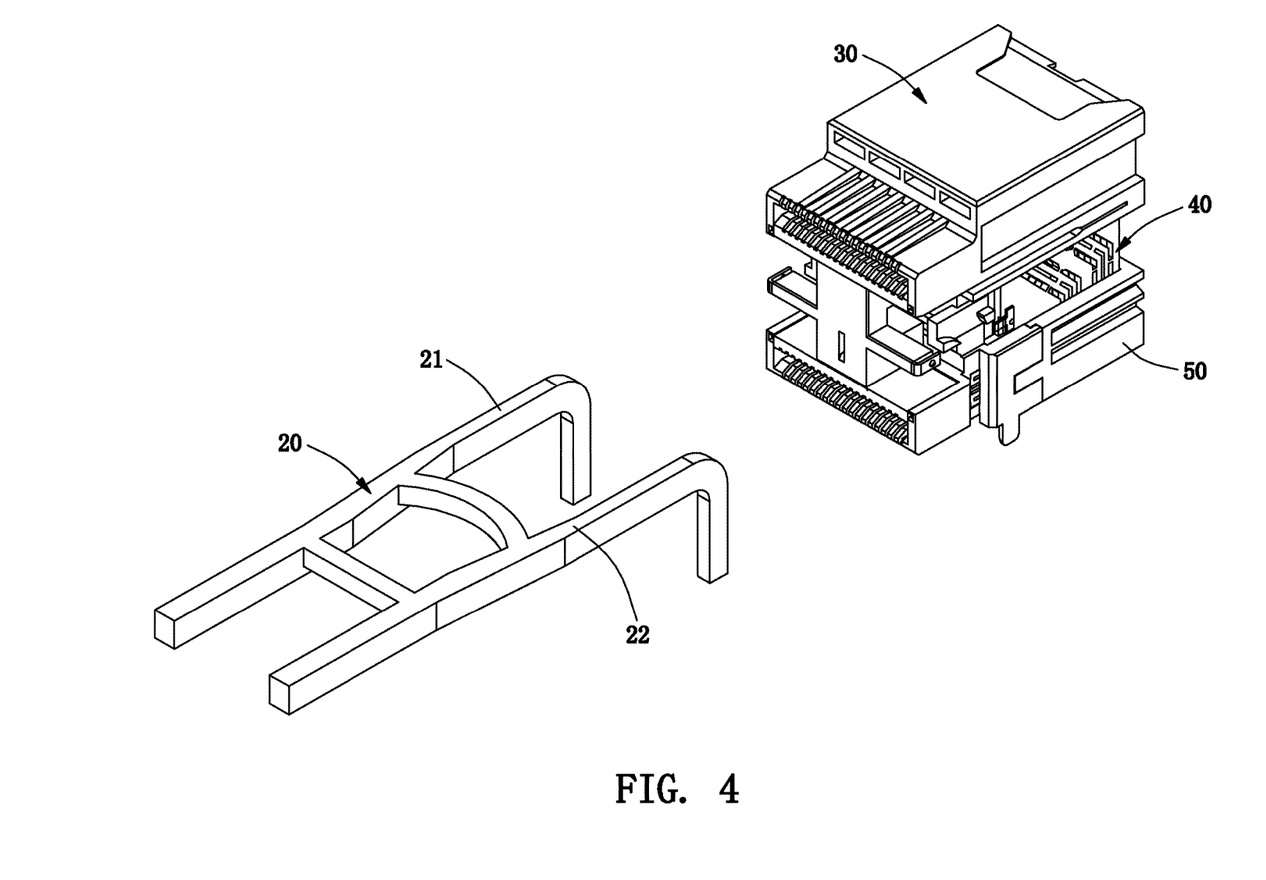
FIG. 4 is a perspective schematic view showing that a light guide member of FIG. 3 is disassembled.

Referring to FIG. 4, the light guide member 20 includes two symmetrical light guide tubes 21, 22, which are connected together and are made of materials suitable for propagating light. The rear ends of the two light guide tubes 21, 22 are mounted on two sides of the socket housing 30, and the front ends of the two light guide tubes 21, 22 are located in front of the socket housing 30. Moreover, as shown in FIG. 2, the spacer 15 can substantially cover the light guide member 20.

Please refer to FIGS. 5, 6, 8 and 9, the socket housing 30 includes an insulating base 31 and an anti-EMI block 32 mounted on the insulating base 31.

Figure 8:
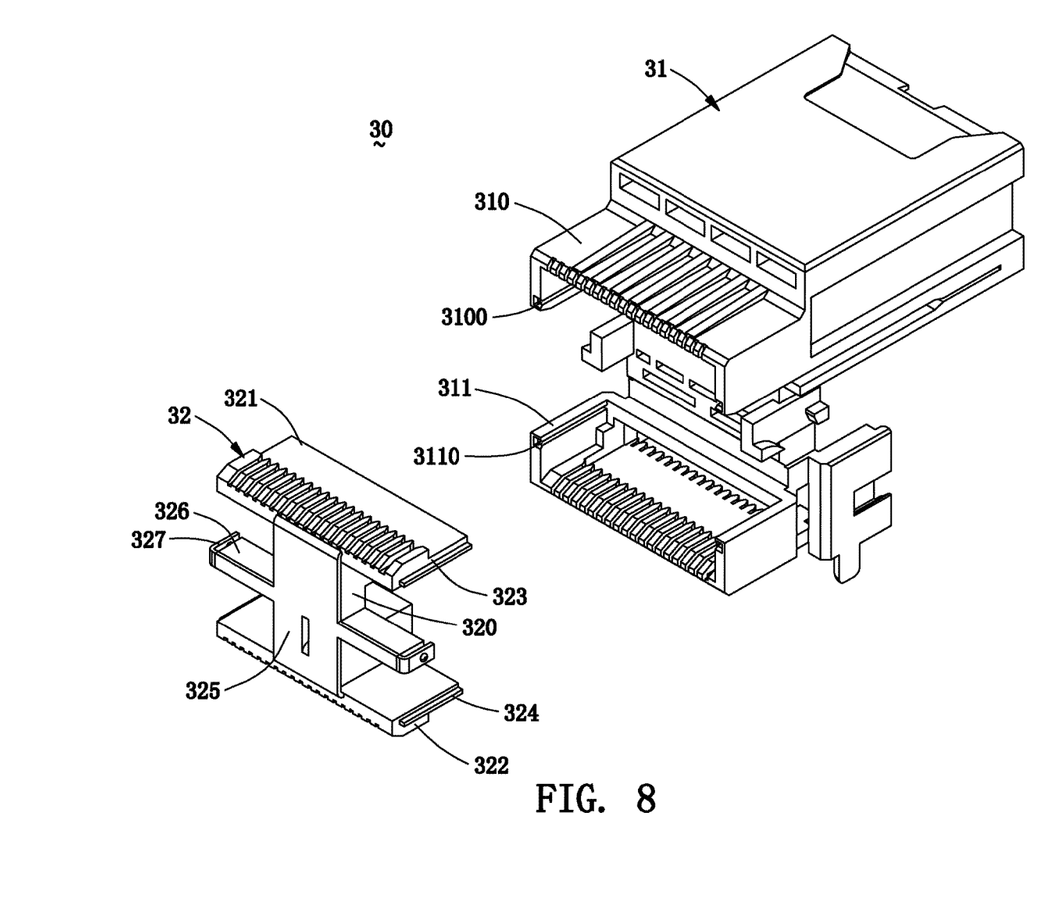
FIG. 8 is an exploded view of the socket housing of FIG. 5.
Figure 9:
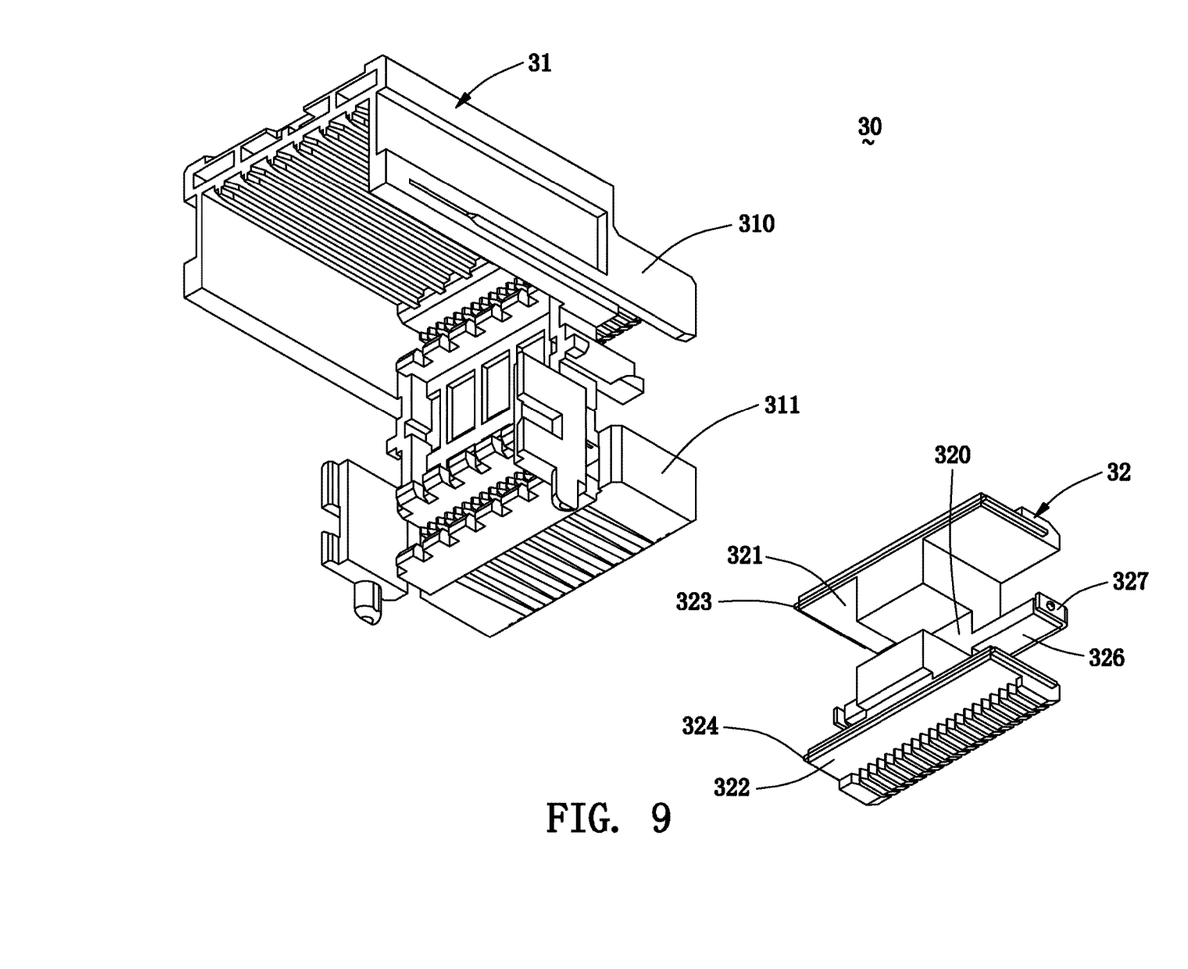
FIG. 9 is an exploded view of the socket housing disassembled along another direction.

Referring to FIGS. 8 and 9, the insulating base 31 has an upper bracket 310 extending horizontally and a lower bracket 311 extending horizontally. The lower bracket 311 is located under the upper bracket 310, is symmetrical to the upper bracket 310 and is separated from the upper bracket 310.

Referring to FIGS. 8 and 9, the anti-EMI block 32 has an upright portion 320, an upper horizontal board 321 located on the top of the upright portion 320, a lower horizontal board 322 located on the bottom of the upright portion 320, an upper grounding sheet 323 embedded in the upper horizontal board 321, a lower grounding sheet 324 embedded in the lower horizontal board 322, and an upright grounding sheet 325 connecting the upper grounding sheet 323 and the lower grounding sheet 324 and being attached on the upright portion 320.

Figure 5:
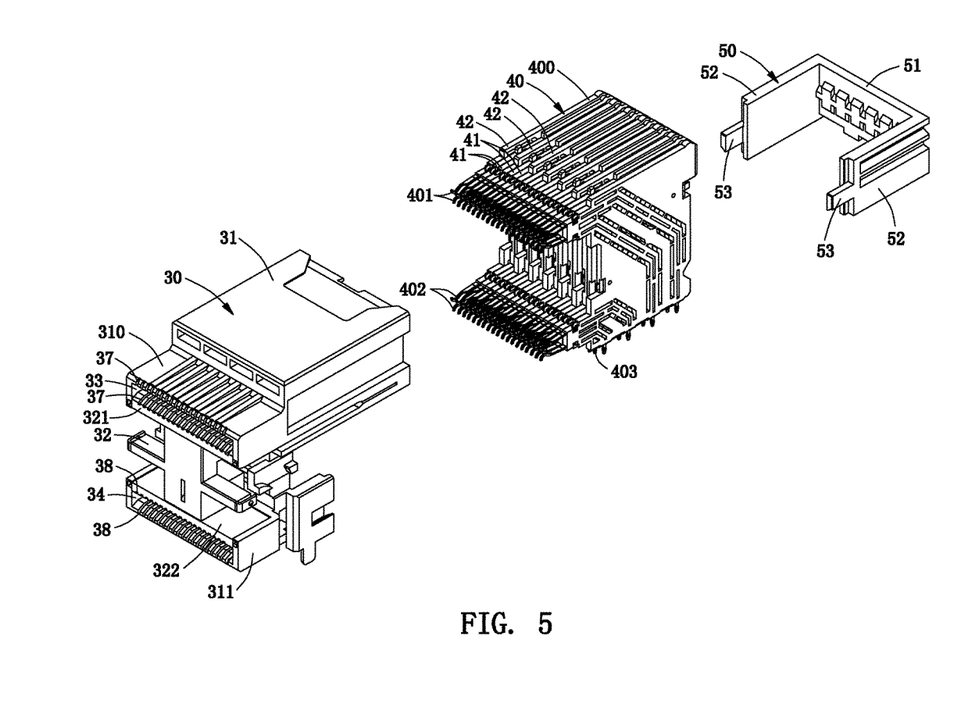
FIG. 5 is a perspective schematic view of a socket housing, multiple terminal assemblies and a retainer, which are disassembled.

Referring to FIG. 5, the anti-EMI block 32 is mounted between the upper bracket 310 and the lower bracket 311. The upper horizontal board 321 is combined with the upper bracket 310 to form an upper circuit board slot 33 for receiving an upper circuit board of the outer plug module. The lower horizontal board 322 is combined with the lower bracket 311 to form a lower circuit board slot 34 for receiving a lower circuit board of the outer plug module.

Referring to FIGS. 8 and 9, in the embodiment, the upper bracket 310 is inverted U type, and the lower bracket 311 is U type. The upper bracket 310 is provided with a pair of upper guiding grooves 3100 formed on two opposite inner walls of the upper bracket 310. The lower bracket 311 is provided with a pair of lower guiding grooves 3110 formed on two opposite inner walls of the lower bracket 311. In the embodiment, two edges of the upper grounding sheet 323 protrude out of the left and right sides of the upper horizontal board 321, and two edges of the lower grounding sheet 324 protrude out of the left and right sides of the lower horizontal board 322.

When the anti-EMI block 32 is combined with the insulating base 31, the two edges of the upper grounding sheet 323 are inserted into the pair of upper guiding grooves 3100 respectively, and the two edges of the lower grounding sheet 324 are inserted into the pair of lower guiding grooves 3110 respectively, whereby the anti-EMI block 32 is fixed on the insulating base 31.

Referring to FIGS. 8 and 9, in the embodiment, the anti-EMI block 32 further has two support arms 326 being located between the lower horizontal board 322 and the lower horizontal board 322 and protruding respectively from the left and right sides of the upright portion 320, and two L-shaped grounding arms 327 covering the corresponding support arms 326. The two support arms 326 and the two grounding arms 327 are used to support the light guide member 20 mounted on the socket housing 30.

Figure 10:
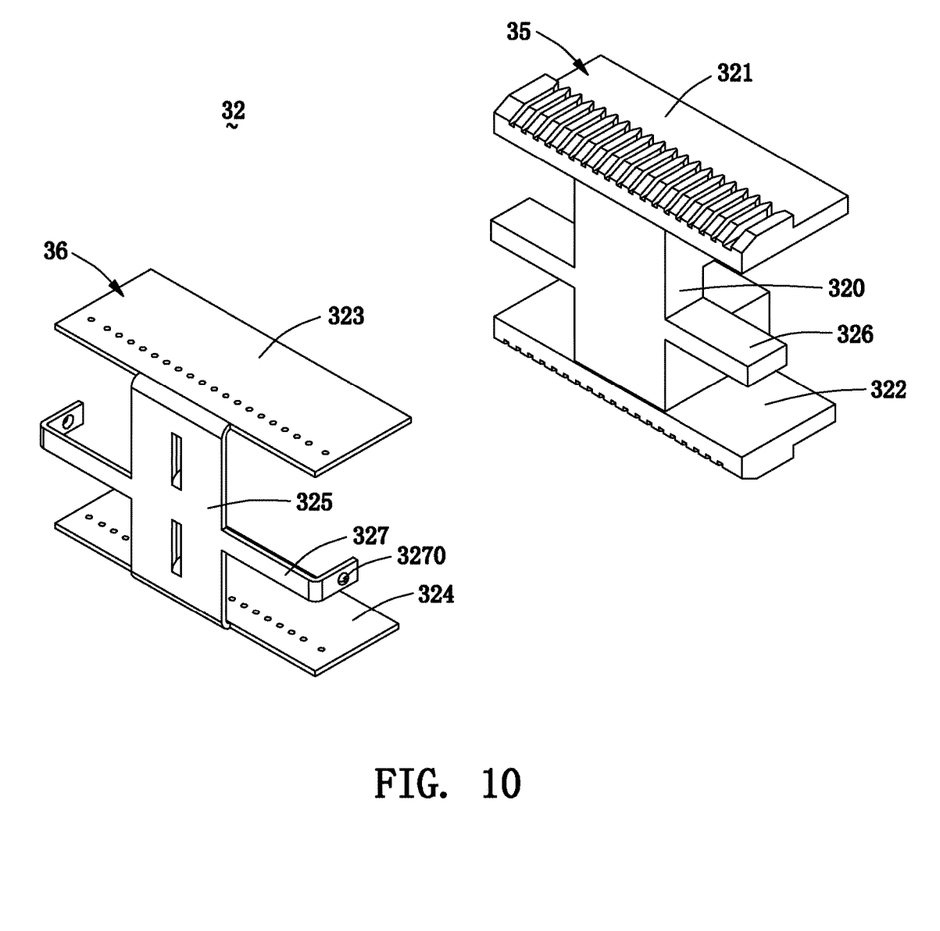
FIG. 10 is an exploded view of an anti-EMI block of FIG. 8.
Figure 11:
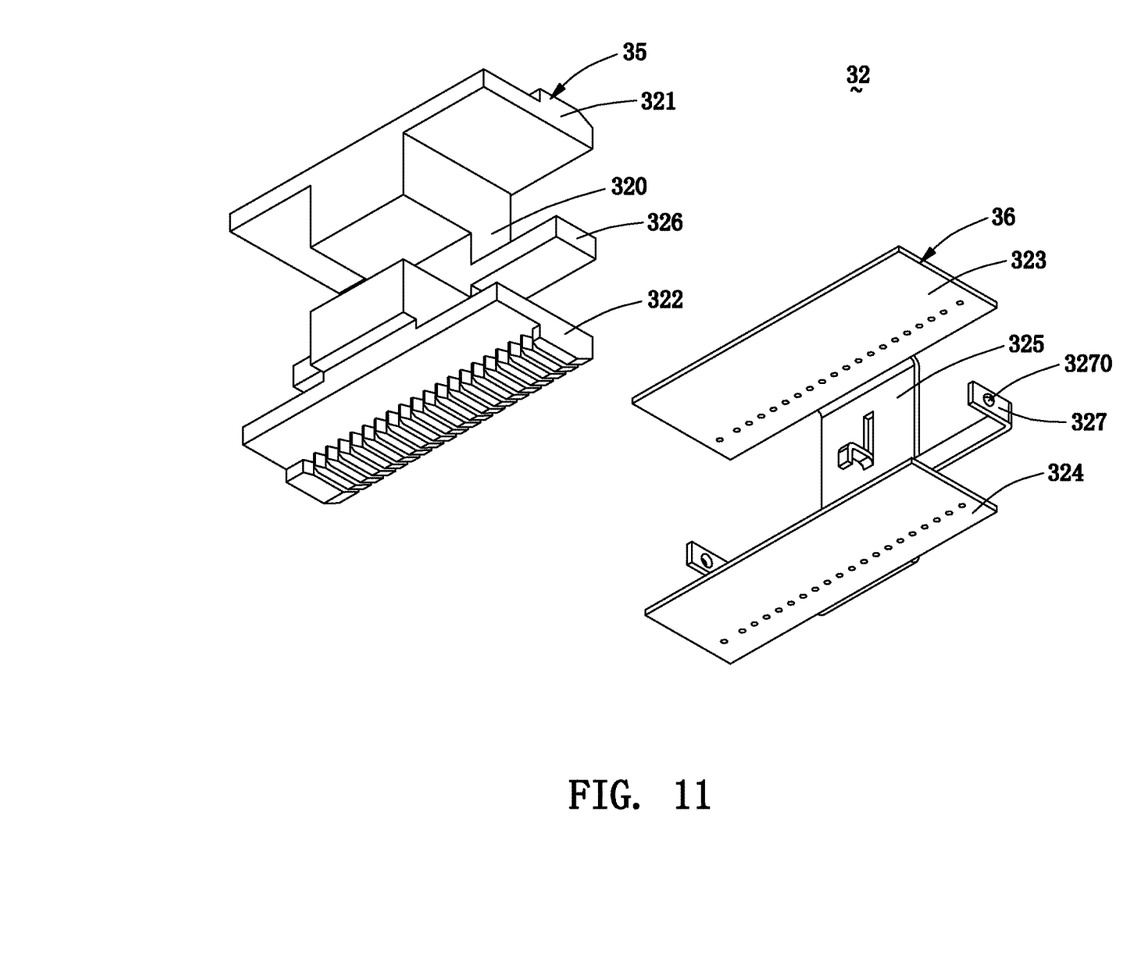
FIG. 11 is an exploded view of the anti-EMI block disassembled along another direction.

Please refer to FIGS. 10 and 11, in the embodiment, the anti-EMI block 32 includes an insulating body 35 and a metal member 36. The shape of the metal member 36 is substantially matched with the shape of the insulating body 35. The metal member 36 is embedded into the insulating body 35 by injection molding process to form the anti-EMI block 32. Specifically, the insulating body 35 includes the upright portion 320, the upper horizontal board 321, the lower horizontal board 322 and the two support arms 326. The metal member 36 includes the upper grounding sheet 323, the lower grounding sheet 324, the upright grounding sheet 325 and the two L-shaped grounding arms 327. Moreover, each grounding arm 327 forms a protrusion 3270 thereon. After assembled, the protrusion 3270 can be contacted with the shielding frame 11 shown in FIG. 2 to form a grounding path and achieve the purpose of anti-electromagnetic interference.

Referring to FIG. 5, the insulating base 31 includes two rows of upper terminal-receiving grooves 37 formed respectively on the upper bracket 310 and on the upper horizontal board 321 and located in the upper circuit board slot 33, and two rows of lower terminal-receiving grooves 38 formed respectively on the lower bracket 311 and on the lower horizontal board 322 and located in the lower circuit board slot 34.

Figure 6:
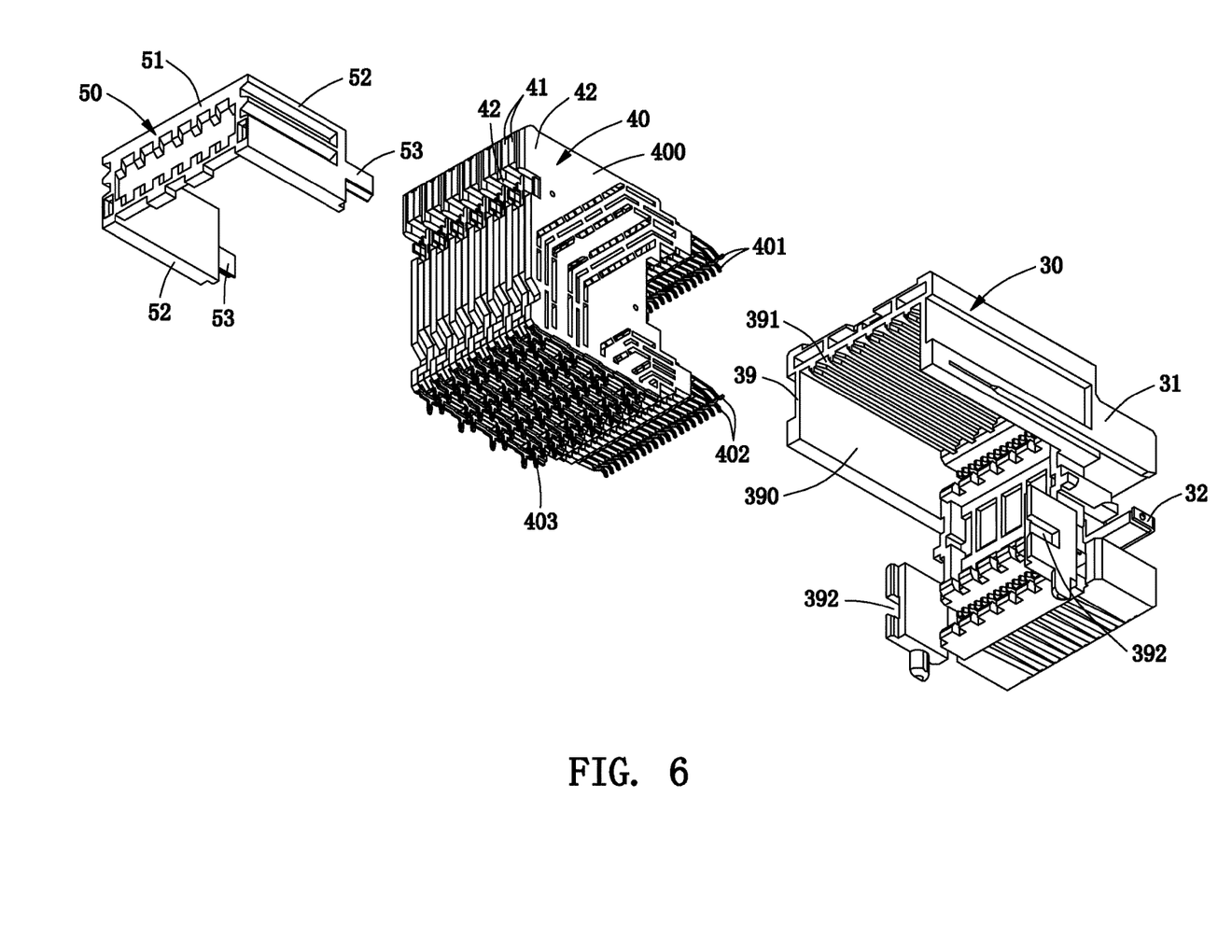
FIG. 6 is a perspective schematic view of the socket housing, the terminal assemblies and the retainer, which are disassembled along another direction.

Referring to FIG. 6, the insulating base 31 further has a mounting frame 39 extending rearward from the top of the insulating base 31, and a mounting space 390 formed below the mounting frame 39 to receive the terminal assemblies 40. There forms multiple swallow-tailed long grooves 391 on the top of the mounting space 390 to be used to fix the corresponding terminal assemblies 40. Further, the insulating base 31 disposes two holding slots 392 located respectively on two sides of the insulating base 31.

As shown in FIG. 5, these terminal assemblies 40 include multiple signal terminal assemblies 41 and multiple ground terminal assemblies 42. These terminal assemblies 40 are arranged side by side in the order of ground-signal-signal.

Referring to FIGS. 5 and 6, each terminal assembly 40 includes a support frame 400, a pair of upper conductive contact parts 401 extending forward from the front of the support frame 400, a pair of lower conductive contact parts 402 extending forward from the front of the support frame 400, and multiple conductive tails 403 extending downward from the bottom of the support frame 400.

Referring to FIGS. 5 and 6, these terminal assemblies 40 are inserted into the mounting space 390 from the rear of the mounting frame 39 along the corresponding long grooves 391. For a single terminal assembly 40, the pair of upper conductive contact parts 401 thereof are inserted into the corresponding upper terminal-receiving grooves 37 and are exposed in the upper circuit board slot 33 to be ready to be electrically connected with the upper plug circuit boards of the outer plug module; the pair of lower conductive contact parts 402 thereof are inserted into the corresponding lower terminal-receiving grooves 38 and are exposed in the lower circuit board slot 34 to be ready to be electrically connected with the lower plug circuit boards of the outer plug module.

Figure 7:
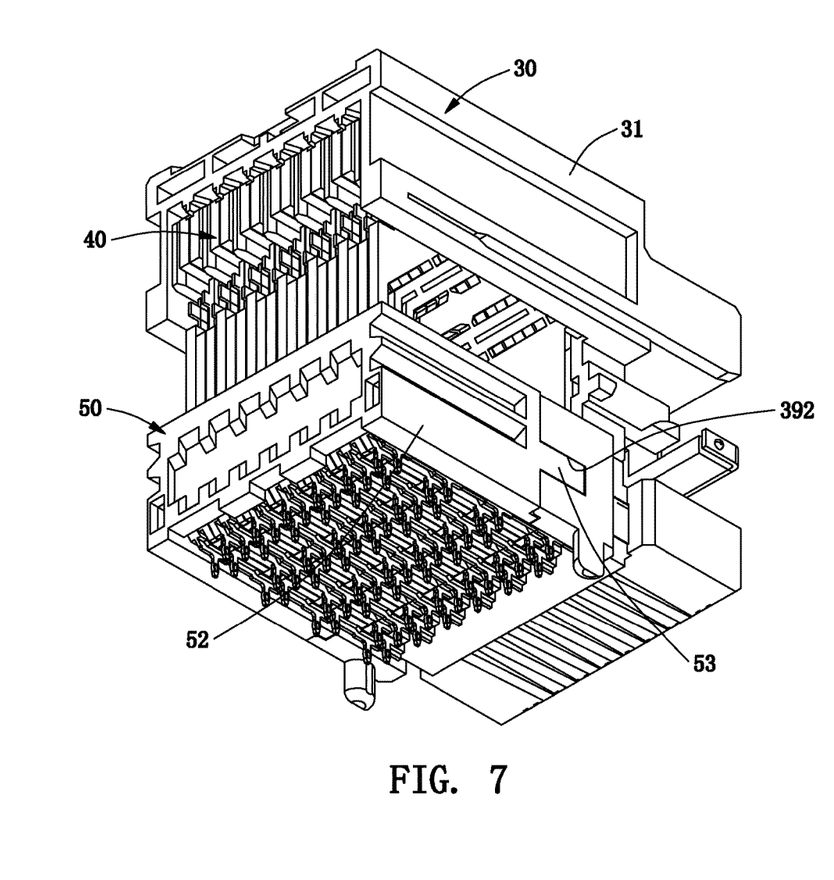
FIG. 7 is a perspective schematic view of the socket housing, the terminal assemblies and the retainer after combined together.

Referring FIGS. 2 and 7, the pluggable connector 1 further includes a retainer 50 for fixing these terminal assemblies 40.

Referring to FIGS. 5 and 6, the retainer 50 is U-shaped. The retainer 50 has a first holding arm 51 and two parallel second holding arms 52 being perpendicular to the first holding arm 51. The front end of each second holding arm 52 is suddenly narrowed to form a protruding part 53.

Referring to FIG. 7, when these terminal assemblies 40 are mounted on the socket housing 30, the retainer 50 holds the terminal assemblies 40 from the rear of the terminal assemblies 40, and the protruding parts 53 of the two second holding arms 52 are engaged with the corresponding holding slots 392 located on the two sides of the insulating base 31 for further fixing the terminal assemblies 40.

Referring to FIG. 1, after the pluggable connector 1 is assembled, the upper port 101 of the shielding case 10 is aligned with the upper circuit board slot 33 (label seen in FIG. 5) of the socket housing 30, and the lower port 102 is aligned with the lower circuit board slot 34 (label seen in FIG. 5) of the socket housing 30.

As described above, the pluggable connector 1 of the present invention employs the anti-EMI block 32 to improve the anti-electromagnetic interference capability.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pluggable connector with anti-electromagnetic interference capability, comprising:
   a socket housing including an insulating base and an anti-EMI block mounted on the insulating base; the insulating base having an upper bracket extending horizontally and a lower bracket being located under the upper bracket; the anti-EMI block being mounted between the upper bracket and the lower bracket; the anti-EMI block having an upright portion, an upper horizontal board located on the top of the upright portion, a lower horizontal board located on the bottom of the upright portion, an upper grounding sheet embedded in the upper horizontal board, a lower grounding sheet embedded in the lower horizontal board, and an upright grounding sheet connecting the upper grounding sheet and the lower grounding sheet and being attached on the upright portion; the upper horizontal board being combined with the upper bracket to form an upper circuit board slot, and the lower horizontal board being combined with the lower bracket to form a lower circuit board slot; the insulating base further having a mounting frame extending rearward from the top of the insulating base and a mounting space formed below the mounting frame;

multiple terminal assemblies being mounted in the mounting space and including multiple signal terminal assemblies and multiple ground terminal assemblies; the terminal assemblies being arranged side by side in the order of ground-signal-signal; and a shielding case having an upper port and a lower port; the upper port being aligned with the upper circuit board slot, and the lower port being aligned with the lower circuit board slot.

2. The pluggable connector as claimed in claim 1, wherein the insulating base includes two rows of upper terminal-receiving grooves and two rows of lower terminal-receiving grooves; the two rows of upper terminal-receiving grooves are formed respectively on the upper bracket and the upper horizontal board and are located in the upper circuit board slot, and the two rows of lower terminal-receiving grooves are formed respectively on the lower bracket and the lower horizontal board and are located in the lower circuit board slot.

3. The pluggable connector as claimed in claim 2, wherein each terminal assembly includes a support frame, a pair of upper conductive contact parts extending forward from the front of the support frame, a pair of lower conductive contact parts extending forward from the front of the support frame and being located under the pair of upper conductive contact parts, and multiple conductive tails extending downward from the bottom of the support frame; the pair of upper conductive contact parts are inserted into the corresponding upper terminal-receiving grooves and are exposed in the upper circuit board slot; and the pair of lower conductive contact parts are inserted into the corresponding lower terminal-receiving grooves and are exposed in the lower circuit board slot.

4. The pluggable connector as claimed in claim 1, wherein the upper bracket and the lower bracket are symmetrical to each other and are spaced apart; the upper bracket is inverted U type, and the lower bracket is U type; the upper bracket is provided with a pair of upper guiding grooves, and the lower bracket is provided with a pair of lower guiding grooves;

two edges of the upper grounding sheet protrude out of the left and right sides of the upper horizontal board and are inserted into the pair of upper guiding grooves respectively; and two edges of the lower grounding sheet protrude out of the left and right sides of the lower horizontal board and are inserted into the pair of lower guiding grooves respectively.

5. The pluggable connector as claimed in claim 1, wherein the anti-EMI block further has two support arms being located between the lower horizontal board and the upper horizontal board and protruding respectively from the left and right sides of the upright portion, and two L-shaped grounding arms covering the corresponding support arms.

6. The pluggable connector as claimed in claim 5, wherein the anti-EMI block includes an insulating body and a metal member embedded into the insulating body;

the insulating body includes the upright portion, the upper horizontal board, the lower horizontal board and the two support arms; and the metal member includes the upper grounding sheet, the lower grounding sheet, the upright grounding sheet and the two L-shaped grounding arms; each grounding arm forms a protrusion thereon.

7. The pluggable connector as claimed in claim 5, further comprising a light guide member, which includes two symmetrical light guide tubes being connected together and being made of materials suitable for propagating light; wherein the two light guide tubes are supported by the two support arms and the two grounding arms, the rear ends of the two light guide tubes are fixed on two sides of the socket housing, and the front ends of the two light guide tubes are located in front of the socket housing.

8. The pluggable connector as claimed in claim 1, further comprising a retainer for fixing the terminal assemblies, wherein the retainer is U-shaped and has a first holding arm and two parallel second holding arms being perpendicular to the first holding arm;

the insulating base disposes two holding slots located respectively on two sides thereof;

when the terminal assemblies are mounted on the socket housing, the retainer holds the terminal assemblies from the rear of the terminal assemblies, and the fronts of the two second holding arms are engaged with the corresponding holding slots to fix the terminal assemblies.

9. The pluggable connector as claimed in claim 1, wherein the mounting frame forms multiple long grooves on the top of the mounting space to fix the corresponding terminal assemblies.

10. The pluggable connector as claimed in claim 1, wherein the shielding case includes a shielding frame, a bottom plate mounted on the bottom of the shielding frame, a rear plate mounted on the rear of the shielding frame, a cover around the front of the shielding frame, a spacer located in the middle of the shielding frame for separating the upper port and the lower port, and a grounding spring being located inside the shielding frame and being fixed on the socket housing.

* * * * *